United States Patent
Deng et al.

(10) Patent No.: US 7,970,016 B2
(45) Date of Patent: *Jun. 28, 2011

(54) SYSTEMS AND METHODS FOR TRANSMISSION AND RECEPTION OF DATA INCLUDING FREQUENCY AND CHANNEL CODE SELECTION

(75) Inventors: Christopher Deng, Torrance, CA (US); Yi Fan, Valencia, CA (US); Igor Elgorriaga, Palos Verdes Peninsulas, CA (US); Mau-Chung Frank Chang, Los Angeles, CA (US)

(73) Assignee: Silicon Storage Technology, Inc., Sunnyvale, CA (US)

( * ) Notice: Subject to any disclaimer, the term of this patent is extended or adjusted under 35 U.S.C. 154(b) by 351 days.

This patent is subject to a terminal disclaimer.

(21) Appl. No.: 12/060,807

(22) Filed: Apr. 1, 2008

(65) Prior Publication Data

US 2008/0298442 A1 Dec. 4, 2008

Related U.S. Application Data

(63) Continuation-in-part of application No. 11/809,267, filed on May 30, 2007.

(51) Int. Cl.
*H04J 1/00* (2006.01)
(52) U.S. Cl. .................................................. 370/480
(58) Field of Classification Search .............. 370/480, 370/479, 481
See application file for complete search history.

(56) References Cited

U.S. PATENT DOCUMENTS

| | | | | |
|---|---|---|---|---|
| 5,138,440 A | * | 8/1992 | Radice | 348/472 |
| 6,311,155 B1 | * | 10/2001 | Vaudrey et al. | 704/225 |
| 6,636,474 B1 | * | 10/2003 | Tanaka et al. | 369/275.3 |
| 2004/0184426 A1 | * | 9/2004 | Tan | 370/338 |
| 2006/0056524 A1 | * | 3/2006 | Cho et al. | 375/260 |
| 2008/0253284 A1 | * | 10/2008 | Montalvo et al. | 370/230 |

* cited by examiner

*Primary Examiner* — Derrick W Ferris
*Assistant Examiner* — Mohammad Anwar
(74) *Attorney, Agent, or Firm* — DLA Piper LLP (US)

(57) ABSTRACT

Systems and methods are disclosed for wireless transmission and reception of data including processing and buffering features. According to one or more exemplary aspects, there is provided a wireless audio receiver for receiving a plurality of packets of encoded audio data. Moreover, the receiver includes at least one receiving component that receives the plurality of packets to generate a plurality of decoded signals, a decoding component that decodes the first packet of encoded data transmitted to produce decoded data, and a selecting component that identifies the mechanisms for receiving additional encoded data. Other exemplary embodiments may include one or more receiving components that processing data regarding antenna, frequencies and channels selected for transmission, as well as an audio component that receives the decoded signals and produces decoded audio signals.

32 Claims, 5 Drawing Sheets

XX:XX STANDS FOR T110:T120

SYSTEMS AND METHODS FOR TRANSMISSION AND RECEPTION OF DATA INCLUDING FREQUENCY AND CHANNEL CODE SELECTION

TECHNICAL FIELD

This is a continuation-in-part application of U.S. patent application Ser. No. 11/809,267 filed May 30, 2007, and whose disclosure is incorporated herein by reference in its entirety.

RELEVANT FIELD

The present innovations relate to systems and methods of transmission and reception of data, and, more particularly, to aspects thereof associated with channel code and frequency selection in the transmission and reception of audio data.

BACKGROUND OF THE INVENTION

Description of Related Information

Wireless transmission and receipt of streaming data typically includes transmission, processing, buffering and receiving performed as a function of clock information, such as clock recovery and bit clock data, or by related tracking loop information. In selecting most efficient transmission mechanisms/schemes, for example, typical systems make measurements at the data sink or receiver on values like packet or bit error rate, or signal strength. However, since the transmission mechanisms/schemes are selected based on such time domain observations, the capabilities of selecting and diversifying the transmission are limited. Drawbacks of these systems surround the failure of utilizing combinations of spatial, frequency, and time mechanisms/schemes to achieve the full breadth of transmission diversity available.

Other existing systems for processing and receiving streaming data sometimes include specialized tracking components implemented to process such information even during times when it is changing very rapidly. However, such components generally must be realized via complex and/or dedicated hardware such as application specific hardware. Components such as these are unable to be developed readily and easily, and they are difficult to modify after production.

Further, many existing tracking components operate based on theories of clock recovery. These systems are directed to situations where receiving elements track only at a rate at which the physical bits are being clocked into the system, such that data is drawn from a receiving buffer at a rate that matches the rate of the data source. These systems do not address concerns where mere clock rate tracking fails to enable accurate receipt of wireless data.

In addition, if there are errors in the transmission, e.g. in the medium, with a fixed clock rate in the receiver to clock out the bits received in the buffer of the receiver, an underflow condition might occur whereby data is clocked faster than it is received.

In sum, there is a need for systems and methods that can adequately transmit and receive streaming data by, for example, including buffering and diversity transmission features that overcome such drawbacks while maintaining low system complexity.

SUMMARY

Systems and methods consistent with the present innovations are directed to processing data including features related to frequency and channel code selection, transmitting, processing and receiving data. Accordingly, in one aspect of the present invention, an audio transceiver receives a plurality of packets of encoded audio data transmitted through a first frequency. The audio receiver comprises at least one receiving component that receives the plurality of packets to generate a plurality of decoded signals. The at least one receiving component is configured to receive, at the first frequency, a first packet of transmitted encoded data. The first packet includes information on a second frequency of transmission of a second packet subsequent to the first packet. The receiving component is further configured to receive at the second frequency, the second packet of transmitted encoded data, after the first packet. Finally, the receiving component is configured to transmit at the second frequency an acknowledgement packet after receipt of the second packet.

In another aspect of the present invention an audio transceiver receives a plurality of packets of encoded audio data transmitted through a first channel code. The audio receiver comprises at least one receiving component that receives the plurality of packets to generate a plurality of decoded signals. The at least one receiving component is configured to receive, at the first channel code, a first packet of transmitted encoded data. The first packet includes information on a second channel code of transmission of a second packet subsequent to the first packet. The receiving component is further configured to receive at the second channel code, the second packet of transmitted encoded data, after the first packet. Finally, the receiving component is configured to transmit at the second channel code an acknowledgement packet after receipt of the second packet.

The present invention also relates to a method of transmitting and receiving audio digital signals with the capability of changing the frequency and/or channel codes to avoid interference.

DESCRIPTION OF THE DRAWINGS

The accompanying drawings, which constitute a part of this specification, illustrate various embodiments and aspects of the present invention and, together with the description, explain the principles of the invention. In the drawings.

DETAILED DESCRIPTION

Reference will now be made in detail to the invention, examples of which are illustrated in the accompanying drawings. The implementations set forth in the following description do not represent all implementations consistent with the claimed invention. Instead, they are merely some examples consistent with certain aspects related to the invention. Wherever possible, the same reference numbers will be used throughout the drawings to refer to the same or like parts.

Many systems and environments are used to transmit, process and receiving streaming data. Examples of such system and environments are devices comprised of hardware, firmware, software, or combinations of hardware, firmware and/or software. These systems and environments can be implemented via a variety of elements, including transmitters, transceivers, receivers and/or combinations thereof.

Figure 1:
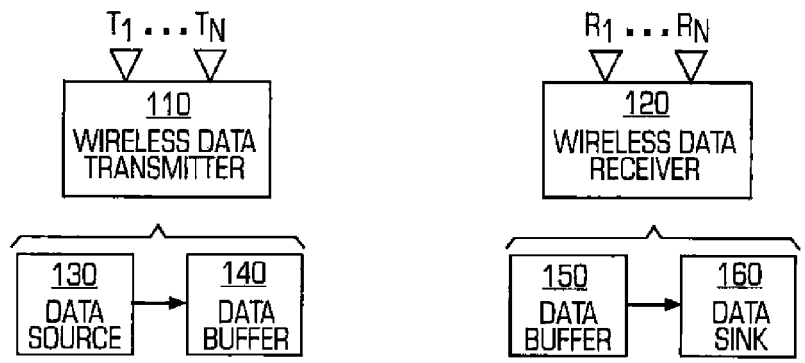
FIG. 1 is a block diagram of an exemplary system consistent with certain aspects related to the present invention.

FIG. 1 illustrates a block diagram of an exemplary system consistent with certain aspects related to the present innovations. As shown in FIG. 1, the system may comprise at least one wireless data source 110 and at least one wireless data receiver 120. Within such systems, a wireless data transmitter 110 may be comprised of a data source 130 and a source data buffer 140. Similarly, a wireless data receiver 120 may be comprised of a receiving data sink 160 and a receiving data buffer 150. According to some aspects related to the present innovations, data may be wirelessly transmitted between the source and receiver via diverse transmitting and receiving means, including via pluralities of antenna, pluralities of frequencies and/or pluralities of channel codes. As used herein, the terms "channel code" or "channel codes" are general terms that refer to types of waveforms or waveform modulations, forward error correction applied to transmitted data, and/or other time- or modulation-related waveform coding.

Under such exemplary regimes, a plurality of "N" antenna may exist at both the wireless data transmitter 110 and the data receiver 120. As shown in FIG. 1, antenna are denoted with "T" at the wireless data transmitter 110 (i.e., $T_1$ through $T_N$) and with "R" at the data receiver 120 (i.e., $R_1$ through $R_N$). With regard to transmissions over various frequencies, the data source and data receiver may be configured to use any one of M frequencies, denoted herein by the letter "F" (i.e., $F_1$ through $F_M$). Similarly, use of any of various K channel codes is denoted herein by the letter "C" (i.e., $C_1$ through $C_K$).

Aspects of the innovations herein may be used in association with diversity transmission techniques. Antenna is usually considered as a spatial dimension, frequency is the frequency dimension, and channel code may be considered as a time dimension. Regarding use of these various regimes in connection with the present innovations, multiple antenna, frequencies and/or channel codes may be considered as choices in diversity selection. By changing the combination of these dimensions and their respective parameters, a change in diversity occurs in the system. While a data receiver 120 typically makes the decision by selecting a diversity choice, in certain aspects of the present innovations, the wireless data transmitter 110 can be the master and may make the diversity choice.

Referring to FIG. 1, the wireless data transmitter 110 and data receiver 120 may include one or more buffering components, such as source data buffer 140 and receiving data buffer 150. According to aspects of the present innovations, these buffer levels are monitored to implement various features and advantages. For example, with regard to data transmission and data streaming, data concerning buffer levels may be used to select diversity in multiple dimensions. Further, with regard to the data receiving and associated receiving components addressed in more detail below, data receipt, processing and decoding may be effectuated as a function of buffer levels, both those of the data source and the data receiver, as well as aggregates thereof.

Figure 2:
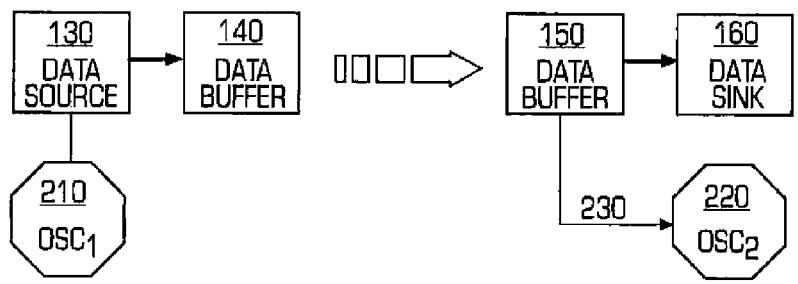
FIG. 2 is a more detailed diagram of a system of the present invention.

Referring to FIG. 2 there is shown a more detailed block diagram of the wireless transmission and receiver system shown in FIG. 1. As shown in FIG. 2, a transmitting side includes a data source 130 that sends data to a first or transmission side buffer 140 at a clock rate controlled by an oscillator 210. Data is then sent wirelessly to a second or receiving buffer 150 for eventual receipt and processing by data sink 160, which may also have its own oscillator 220 associated therewith. A control path 230 is provided to achieve processing and control functionality, including control of the receiving oscillator 220, feedforward, feedback, etc., such as control of certain data rate tracking and buffer over/under flow features that afford innovation over existing systems.

In known systems, for example, a transmitting side data source 130 constantly sends data to the first buffer 140 at a fixed rate determined by the oscillator 210. Next, the first data buffer 140 typically sends its contents to the second buffer 150 to prevent data overflow. Data sink 160 then draws data from the second buffer 150 at a constant rate determined by its oscillator 220. However, frequency offset in the oscillators 210, 220 often introduces errors to such systems. For example, if the data sink 160 draws data too slowly from the second buffer 150, this may create data overflow problems (e.g., data being lost due to insufficient storage in the second buffer 150, etc.). Conversely, if the data sink 160 draws data too quickly from the second buffer 150, this may create data underflow problems (e.g., creation and provision of invalid data to data sink 160 based on insufficient/incomplete data being read from the second buffer 150, etc.).

Other existing solutions also introduce error. For example, in situations where the second buffer 150 is running low, simplistic use of the second buffer 150 to slow down the receiving oscillator 220 to prevent underflow is not ideal. And, similarly, speeding up of the receiving oscillator 220 if the second buffer 150 is almost full to prevent overflow also fails to provide an ideal solution. Here, because, for example, transmission media are imperfect, simplistic solutions such as these also fail to achieve satisfactory adjustment of the receiving oscillator 220.

Turning to FIG. 2, a control path 230 is provided that may provide processing information to and/or control the second oscillator 220 such that the tracking processes of the data sink 160 may be implemented as a function of additional data, such as data transmission or rate information, buffer levels, etc. Improved tracking processes are achieved as a result, providing innovative systems and methods of preventing buffer overflow and/or underflow. First, by tracking as a function of buffer levels instead of clock recovery elements such as phase-lock-loops (PLL's), significant savings are possible in hardware design. For example, bit clocks are changing at a very rapid rate in clock recovery regimes, which means that tracking loops generally must be implemented entirely in application specific hardware. According to the system of FIG. 2, however, tracking algorithms based on buffer levels are readily implemented via software. Due to the slower rate at which the buffer levels change, as compared to clock rates, the software and other, more flexible components set forth herein are able to monitor the buffer levels and provide suitable tracking control. Accordingly, since non-specific design such as software are much easier to develop as well as modify after production, buffer level tracking offers significant advantage over existing application-specific hardware, such as hardware-based clock recovery loops.

According to certain aspects of the present innovations, then, more robust tracking control features are implemented as a function of aggregate buffer level. For example, the aggregate buffer level may be the sum of the transmitting buffer 140 and the receiving buffer 150. Features consistent with such aggregate buffer level functionality provide a variety of advantages, including information regarding the underlying data flow reasons for increases and decreases in the buffer level of the receiving buffer 150. This information enables higher demand data transmission, such as real-time or live data streaming, wireless audio and/or video transmission, etc., wherein input rate from the data source 130 should match the output rate of the data sink 160.

Further, the present innovations include protocols concerning acknowledgement and/or guarantee of packet transfer. Exemplary protocols such as guaranteeing data transfer by requiring acknowledgement from the data receiver for every packet sent are set forth in more detail below. Advantages stemming from these protocols include enabling the aggregate buffer levels to remain constant even during period of difficult transmission, such as signal fading, multipath propagation, and signal interference. Further, due to such protocols, features and observations associated with the receiving buffer may also provide, for example, sufficient information on diversity transmission aspects of the system. Lastly, features of the present innovations allow all transmission errors to be treated as transmission congestion that, i.e., affects the amount of data in the buffers.

Figure 3:
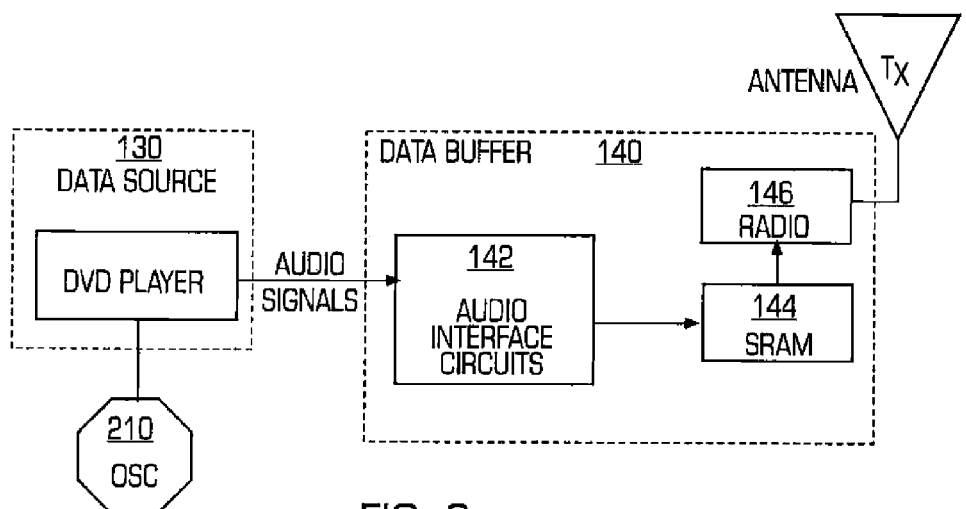
FIG. 3 is a more detailed block diagram illustrating the transmission component in the system of the present invention.

Referring to FIG. 3 there is shown a more detailed block level diagram of one embodiment of the wireless data transmitter 110. One embodiment of the data source 130 may comprise a DVD player. Of course, any other data source, including but not limited to CD, MP3 player, over the air transmission, HDTV etc. all may be used as a data source 130. In a preferred embodiment, the audio signals from the data source 130 are supplied to the data buffer 140 in accordance with the S/PDIF (Sony/Philips Data Interface) standard, which is also a published International IEC 60958 standard.

The data buffer 140 comprises an audio interface circuit 142 for receiving the audio signs from the data source 130. From the audio interface circuit 142, the digitized audio signals are supplied to a transmission buffer 144 or an SRAM or a serial register 144. The level of the transmission buffer 144 is monitored and transmitted to the data receiver 120, as explained in detail hereinafter. The digital audio signals are then supplied to a transceiver 146 which sends the digital signals in packets via a first antenna Tx 108.

Figure 4:
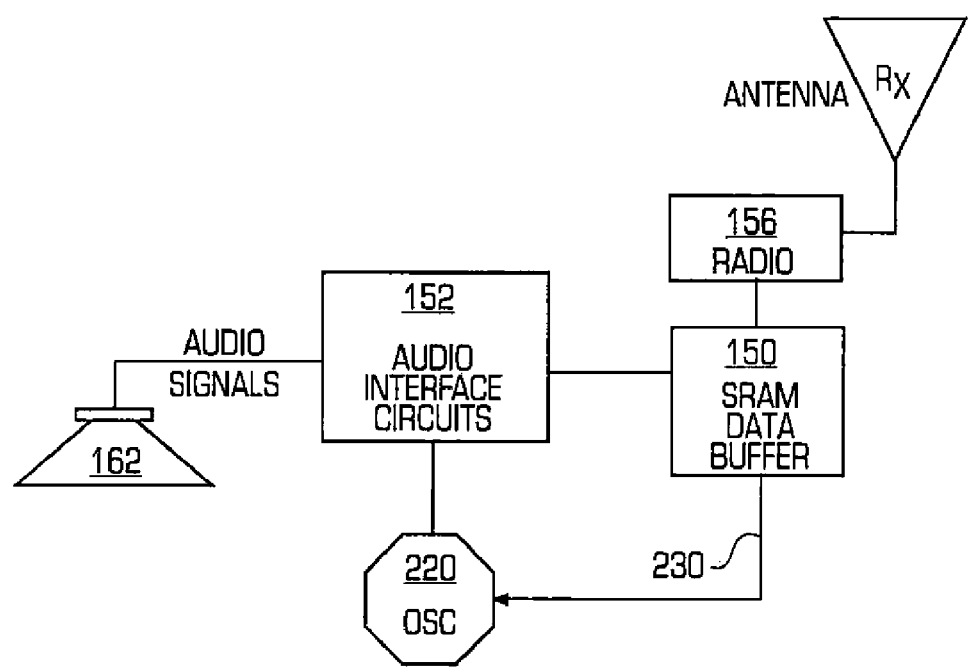
FIG. 4 is a more detailed block diagram illustrating the receiver component in the system of the present invention.

Referring to FIG. 4 there is shown a more detailed block level diagram of one embodiment of the data receiver 120. One embodiment of the data receiver 120 may comprise a receiver antenna Rx 106 to receive the signal from the wireless data transmitter 110, and to send acknowledgement data to the wireless data transmitter 110. The signals are processed by a transceiver 156, which demodulates the signal and generates digital signals, which are supplied to a receiver data buffer 150. From the receiver data buffer 150, the signals are supplied to an audio interface circuit 152, which supplies them to a speaker 162. The digital signals from the buffer 150 are also supplied to the oscillator 220 which controls the audio interface circuit 152.

Figure 8:
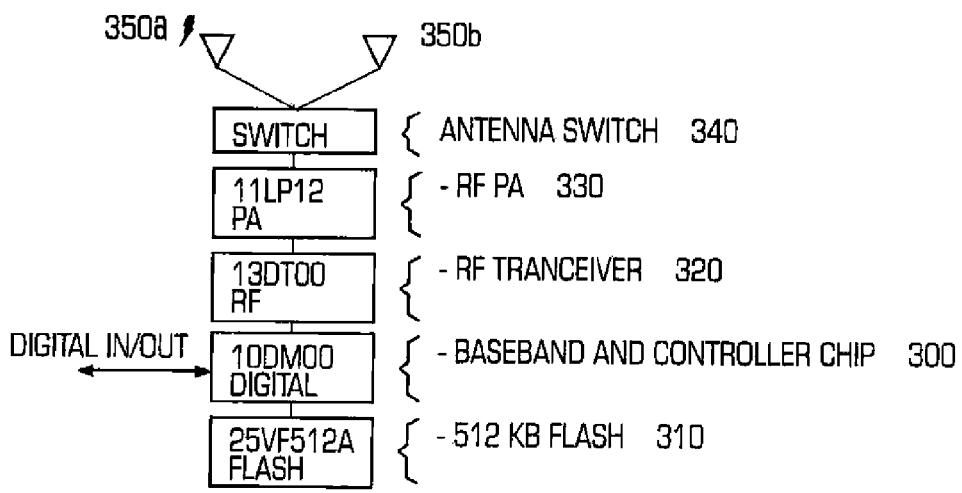
FIG. 8 is a board Level block diagram of the various chips used in the either the transmitter or receiver of the present invention.

Referring to FIG. 8 there is shown a block diagram of the wireless transmitter 110 or wireless data receiver 120 of the present invention. In the preferred embodiment, (as will be discussed hereinbelow) the data receiver 120 also transmits an acknowledgement (ACK) packet, i.e. the receiver 120 is a transceiver and the wireless transmitter 110 also receives the ACK packet. Thus, with the exception of the software controlling the operation of the processor 366 (shown in FIG. 9), the hardware components of the wireless transmitter 110 and the wireless receiver 120 are the same. Therefore, as shown in FIG. 8, the transmitter 110/receiver 120 comprises a baseband and controller chip 300 which interfaces with a flash memory chip 310, as well as an RF transceiver 320. Digital signals are supplied to the baseband and controller chip 300. From the controller chip 300, the signals are supplied to the RF transceiver 320, which are then supplied to an RF power amplifier 330 (for further amplification), and finally through an antenna switch 340 to one of the antennas 350.

Figure 9:
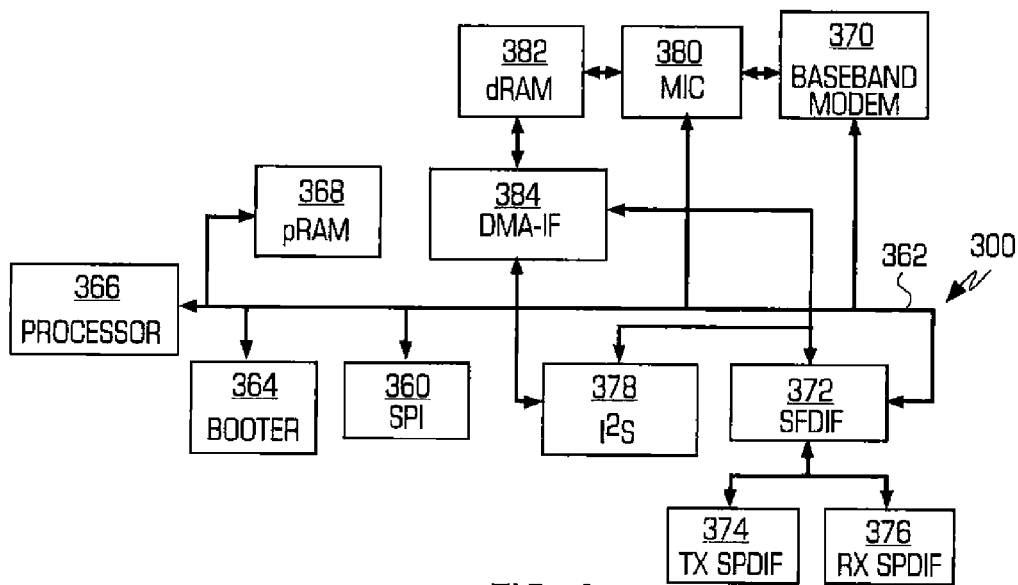
FIG. 9 is a detailed block diagram of the baseband and controller chip shown in FIG. 8.
Figure 10:
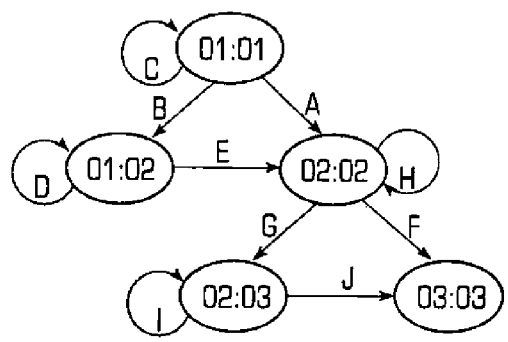
FIG. 10 is a state diagram showing the protocol used to establish communication between the transmitter and receiver of the present invention.

The controller chip 300 is shown in greater detail in FIG. 9. The controller chip 300 comprises a Serial/Parallel Interface 360 which receives digital signals. The digital signals are then supplied to a bus 362. From the bus 362, the digital signals are supplied to various components of the controller chip 300, including a processor 366, a booter 364, pRAM 368, MIC (Modem Interface Controller) 380, baseband modem 370, and SPDIF interface 372. The processor 366 executes the software that are described hereinbelow. The Booter 364 is a Non-volatile memory chip containing boot up software for the processor 366. Either the flash 310 external to the chip 300 or the booter 364 may also contain the code for the software for the processor 366 to perform the methods described herein. The pRAM 368 or program RAM is a volatile memory which is used primary as a cache during the operation of the processor 366, and consists of 6T SRAM cells. The MIC 380 functions as a bridge between the baseband modem 370 and the dRAM 382. It controls the data movement between these two circuit blocks. The baseband modem 370 performs the function of digital modulation and digital demodulation necessary for wireless transport of data. The baseband modem 370 interfaces with the MIC 380 in a serial interface of clock and data ports, which is well known in the art. The controller chip 300 also comprises the following components: dRAM 382, DMA-IF 384, and I$^2$S 378. The function of each of these components is as follows. The dRAM 382 serves as a volatile storage for the MIC 380. It typically is realized using 6T SRAM. The DMA-IF 384 is a direct memory access device designed retrieve content from the dRAM 382 without going through the processor 366. The data retrieved by the DMA-IF 384 is supplied to the I$^2$S 378. The I$^2$S 378 is an Inter-IC Sound circuit, which connects to the I/O pins of the chip. In the case of a data sink 160, the data retrieved goes to the I$^2$S 378, which is connected to the I/O pins and supplies that data to another chip. In the case of a data source 130, the I$^2$S 378 acts as an input interface so the DMA 384 transfers the data from the I$^2$S 378 and writes it directly into the dRAM block 382.

Figure 5:
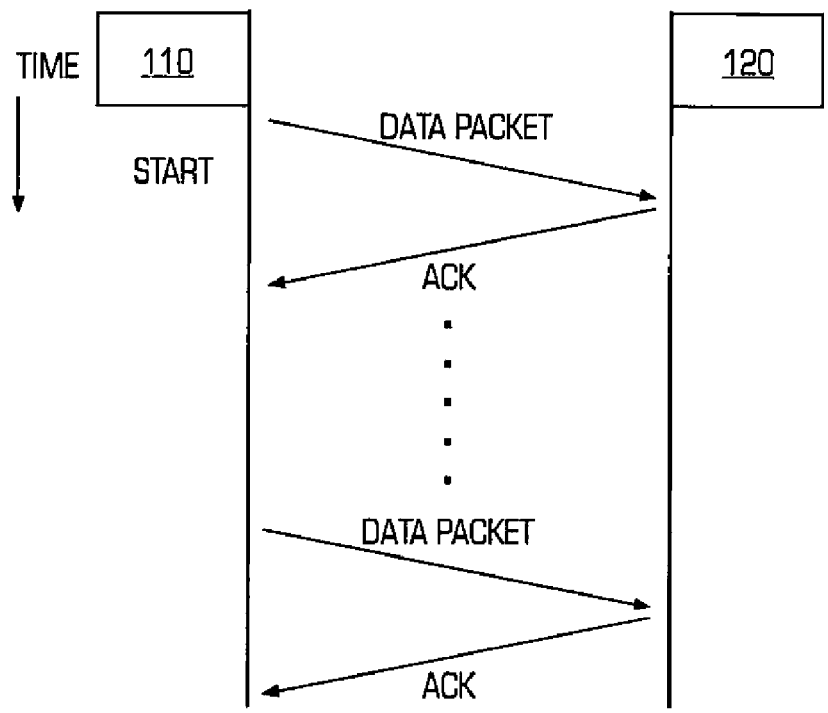
FIG. 5 is a chart illustrating the protocol in the transmission and reception of wireless signals in the system and method of the present invention.

Referring to FIG. 5 there is shown generally the protocol in the transmission and receipt of signals between the wireless data transmitter 110 and the data receiver 120. The wireless data transmitter 110 has a PSN (Packet Serial Number), denoted as PSN110 while the Data receiver 120 has a PSN of PSN120. At the start of operation, PSN110=PSN120. Then, the wireless data transmitter 110 sends a first packet (marked with PSN110) to data receiver 120. The data receiver 120 receives the packet PSN110 and uses checksum, such as CRC32, or any number of other well known error correction techniques to attempt to validate the packet PSN110 If the data packet is correct, data receiver 120 sends back an ACK packet to the wireless data transmitter 110. In addition, if the data packet is correct and PSN110 (extracted from the data packet) equals to PSN120, which means that the data receiver 120 gets what it is expecting, PSN120 is increased by one, and the associated data buffer address pointer will move accordingly. If the data packet is incorrect, data receiver 120 does nothing. The wireless data transmitter 110 uses checksum CRC32 or any other well know error correction technique attempts to validate the ACK packet. If the ACK packet is correct, which means that this packet/ACK iteration is fully completed, PSN110 increases by 1, and the associated data buffer address pointer will move accordingly. If the ACK packet is incorrect, PSN110 remains unchanged, which means the next packet to send remains the same.

In the operation of the wireless system, because the digital data transmitted between the wireless data transmitter 110 and the data receiver 120 are controlled by independent clocks, i.e. oscillator 210 and 220, as previously discussed, a discrepancy may occur, between the transmitted packets of data and the received packets of data as stored in the buffers 140 and 150. Specifically, overflow or underflow conditions may occur. To prevent such conditions, in the present system a method is devised whereby the level of storage in the data source buffer 140 is transmitted to the data receiver 120. Further, the level of storage in the data receiver buffer 160 is also determined. The aggregate buffer level, i.e. the sum of the two levels is calculated. The sum or the Aggregate Buffer Level (ABL) is maintained at a constant or within a specified range.

Figure 6:
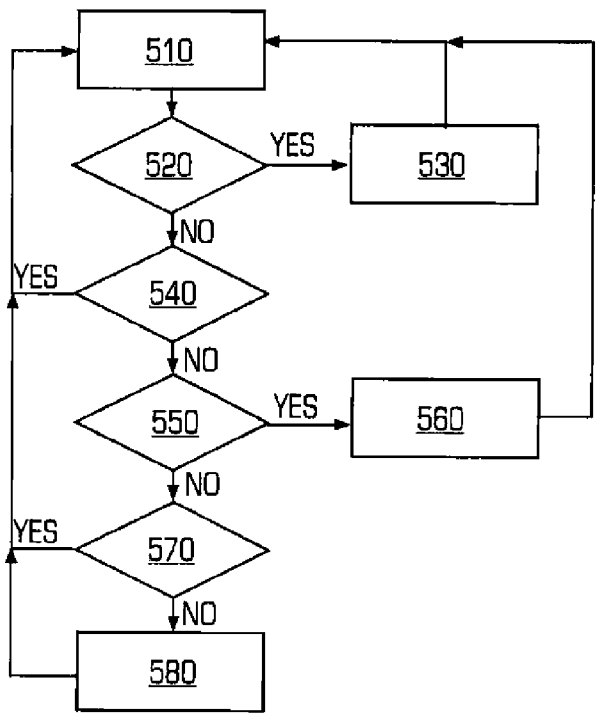
FIG. 6 is a flow chart showing the protocol to establish buffer level in the system and method of the present invention.

Referring to FIG. 6 there is shown a flow chart of the method of maintaining the ABL thereby preventing overflow or underflow conditions. Specifically, in the preferred embodiment, four threshold values are used to achieve double threshold, low-jitter oscillator tracking. The following definitions pertain to the chart shown in FIG. 6.

LH=high threshold value
LL=low threshold value
LP=high threshold of normal range
LQ=low threshold of normal range
L140=data source buffer level
L150=data sink buffer level In block 510, the aggregate buffer level L=L140+L150 is computed. In block 520, a comparison is made L>LH? In block 530, if L exceeds LH, the tracking rate is decreased. (It will sustain in decrease mode and can only be changed by the next entry of 560/580). In block 540, if L>LP? is determined. In block 550, if L<LL? is determined. In block 560, if L<LL then the tracking rate is increased. (It will sustain in increase mode and can only be changed by the next entry of 530/580). In block 570: if L<LQ? Is determined. In block 580 if L is not <LQ, then use normal tracking rate. (It will sustain in normal mode and can only be changed by the next entry of 530/560). The increase or decrease of the ABL can be made by changing the clock frequency of either the oscillator 220 or the oscillator 210.

With regard to initial system power-up, aggregate buffer level is usually invalid because both the transmitting and receiving buffers are typically empty at that time. Thus, to enter operational status, two steps may be performed. First, the data source 130 transmits data as soon as the transmitting data buffer 140 reaches a first predetermined level, $L_1$. Next, the data sink 160 begins buffer draw from the receiving buffer 150 once the receiving buffer reaches a second predetermined level, $L_2$. The sum of these first and second levels, then, may be the aggregate buffer level desired for operation. Accordingly, this technique enables power-up for achieving and maintaining a desired aggregate buffer level.

As can be seen from the foregoing, by controlling the sum or the aggregate of the two buffer levels, and because the buffer level rate changes more slowly than clock rates, the ABL tracking algorithm can be implemented in software, which provides greater flexibility and less cost to implement. Further, ABL tracking offers significant advantage over existing application-specific hardware, such as hardware-based clock recovery loops.

With regard to certain initial aspects, one technique for realizing aggregate buffer level information may include transmitting the level of the source buffer in a data packet header, which may then be extracted by the data receiving elements upon packet reception. In this first technique, the data receiving elements may then compute aggregate buffer level by summing the received source buffer level with the known receiving buffer level. With this technique, it is also possible to maintain the aggregate buffer level constant by for example, changing the clock frequency of the oscillator 220. For example, when oscillators on both the source and receiving components are in a perfectly matched condition, the aggregate buffer level will remain constant. Conversely, using the aggregate buffer level one can control the oscillators of the source and the receiver so that they match.

Tracking features, criteria and control may also vary as a function of how aggregate buffer changes over any given transmission period. For example, if the receiving oscillator 220 is faster than the source oscillator 210, aggregate buffer level will decrease with time. Conversely, if the receiving oscillator 220 is slower than the source oscillator 210, aggregate buffer level will increase with time. In one exemplary aspect, tracking criteria can be initiated as a function of one ore more aggregate buffer level thresholds, such as high and low thresholds. Here, if the aggregate buffer level crosses a high threshold, the receiving oscillator 220 needs to be driven to a higher frequency and, if the aggregate buffer level crosses a low threshold, the receiving oscillator 220 needs to be driven to a slower frequency.

Further in the operation of the wireless system, because of the nature of wireless signals, which are subject to interference and/or disturbance, the transmission and/or reception may be subject to noise and/or interference. Accordingly, it may be desired to change either the antenna, the frequency and/or the channel code. The manner by which each of these parameters may be changed and communicated from one device to the other is described as follows.

As previously discussed, the transmission of each packet from the wireless data transmitter 110 must be followed by the receipt of a ACK or acknowledgment packet from the data receiver 120, received by the wireless data transmitter 110. If the ACK packet is not received by the wireless data transmitter 110, then either the packet transmitted by the wireless data transmitter 110 was not received by the data receiver 120, or interference and/or noise prevented the ACK packet from the data receiver 120 to be received by the wireless data transmitter 110. In either event, and subject to an algorithm of retries, the wireless data transmitter 110 may initiate a process to change either the antenna, the frequency or the channel codes.

The initial antenna selection is set based upon the ratio of buffer #1 in the wireless data transmitter 110, i.e. the buffer level in the transmitter 110 to the fixed value in the ABL. The ABL is divided into $N^2$ sectors. Each sector is assigned an antenna combination. For example the combination of {T1, R1} is chosen for sector 1, {T2, R21} for sector 2, etc. certain permutations are not allowed in order to achieve a certain level of diversity in the system. Thus, {T2, R1} may be the same set as {R1, T2}. Then, the sector region in which buffer #1 resides is assigned that particular antenna.

To change the antenna, the data source simply changes the antenna, i.e. Tx, according to its set. The new antenna set information is transmitted to the data receiver using bits in the packet header. The data receiver 120 receives the new packet and upon receipt of a valid packet changes its antenna according to the received information. Thus, in this case, the change of antenna is no different than a master-slave relationship.

With respect to frequency selection, again the ratio of buffer #1 to the ABL is used to determine the initial frequency selection. The ABL is divided into M sectors, which may overlap with the $N^2$ antenna sectors. For each frequency sector Mx, a frequency channel number is assigned. Thus, M1 is assigned frequency F1 etc.

To change the frequency, assume that the data source is transmitting packets $P_{i-2}$, $P_{i-1}$, $P_i$, $P_{i+1}$, $P_{i+2}$. Further, assume that packets $P_{i-2}$ and $P_{i-1}$ were transmitted at $F_{k-1}$ and that for packets $P_i$, $P_{i+1}$, $P_{i+2}$ are to be transmitted at frequency $F_k$. The wireless data transmitter 110 sends a packet $P_{i-1}$, with a "change frequency" flag set, to notify the data receiver 120 to change to the new frequency of $F_k$. The wireless data transmitter 110 then shifts to transmit packet $P_i$ at frequency $F_k$ without waiting to receive an ACK packet transmitted by the data receiver at frequency $F_{k-1}$. If the data source receives an ACK packet from the data receiver 120 at frequency $F_k$ then it knows that the change of frequency was implemented by the data receiver 120. If, however, the wireless data transmitter 110 does not receive an ACK packet from the data receiver 120 at frequency $F_k$ then it reverts back to sending the packet $P_{i-1}$ with a "change frequency" flag set, at the $F_{k-1}$ frequency.

This method of changing the frequency by anticipating that the "change frequency" flag in the packet was received and assume the data receiver 120 will be at the new frequency channel is superior to the manner of waiting to receive an ACK packet before initiating action. Specifically, if the wireless data transmitter 110 has to wait to receive the ACK packet transmitted by the data receiver 120 at the $F_{k-1}$ frequency, then the system has to experience the transmission of two packets in the $F_{k-1}$ frequency before initiating action. If a frequency channel is very noisy, the likelihood of two packets being successfully transmitted and received becomes a higher burden than expecting that only one packet needs to be successfully transmitted and received.

With respect to channel code selection, again the ratio of buffer #1 to the ABL is used to determine the initial channel code selection. The ABL is divided into K sectors, which may overlap with the $N^2$ antenna sectors or the M frequency sectors. For each channel code sector Kx, a channel code is assigned. Thus, K1 is assigned channel code C1 etc.

To change the channel code, assume that the data source is transmitting packets $P_{i-2}$, $P_{i-1}$, $P_i$, $P_{i+1}$, $P_{i+2}$. Further, assume that packets $P_{i-2}$ and $P_{i-1}$ were transmitted at channel code $C_{k-1}$ and that for packets $P_i$, $P_{i+1}$, $P_{i+2}$ are to be transmitted at channel code $C_k$. The wireless data transmitter 110 sends a packet $P_{i-1}$ with a "change channel code" flag set, to notify the data receiver 120 to change to the new channel code of $C_k$. The wireless data transmitter 110 then shifts to transmit packet $P_i$ at channel code $C_k$ without waiting to receive an ACK packet transmitted by the data receiver at channel code $C_{k-1}$. If the data source receives an ACK packet from the data receiver 120 at channel code $C_k$ then it knows that the change of channel code was implemented by the data receiver 120. If, however, the wireless data transmitter 110 does not receive an ACK packet from the data receiver 120 at channel code $C_k$ then it reverts back to sending the packet $P_{i-1}$ with a "change channel code" flag set, at the $C_{k-1}$ channel code.

This method of changing the channel code is similar to that described for changing frequency in that by anticipating that the "change channel code" flag in the packet was received and assume the data receiver 120 will be at the new channel code is superior to the manner of waiting to receive an ACK packet before initiating action. Specifically, if the wireless data transmitter 110 has to wait to receive the ACK packet transmitted by the data receiver 120 at the channel code $C_{k-1}$, then the system has to experience the transmission of two packets in the $C_{k-1}$ channel code before initiating action. If a channel code is very noisy, the likelihood of two packets being successfully transmitted and received becomes a higher burden than expecting that only one packet needs to be successfully transmitted and received.

Figure 7:
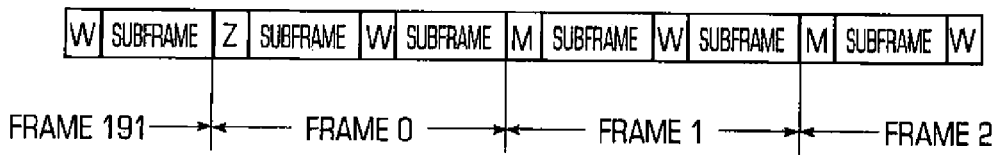
FIG. 7 is a schematic diagram of the audio signal packet in accordance with the SPDIF standard.

Finally, in the present wireless system, as previously described, in the preferred embodiment, the audio signals from the data source 130 are supplied in wired configuration to the data buffer 140 in the S/PDIF format. In the S/PDIF format, which is shown in FIG. 7, a block of data consists of 192 frames. Each frame has two subframes. Each subframe consists of 4 bits of preamble, with 28 bits (or 3.5 bytes, where one (1) byte is 8 bits) of data. The preamble of the first subframe of the first frame in a block is always filled with "Z"—a unique identifier. The preamble of all the first subframes of all subsequent frames in that block (totaling 191 preambles) is filled with "W"—a different unique identifier. Finally, the preamble of all the second subframes in all the frames (total of 192) is filled with "M"—yet a further unique identifier. Thus, in any block there are only three unique preambles: Z, M and W, and if a "Z" is detected, it means that what follows is the start of a block. Thus, in the SPDIF format, the preambles Z, W and M are used to synchronize the transmission and receipt of packets of audio data.

In the present wireless system to save bandwidth, the following method for synchronization is used. The wireless data transmitter 110 transmits only the data portion from each subframe/frame/block. The wireless data transmitter 110 strips away the preamble portion from each packet prior to wireless transmission. Thus, only 7 bytes of data are transmitted from each frame.

When the data is received by data receiver 120, it is stored in the data buffer 150 in bytes. In the preferred embodiment each packet contains 512 bytes. However, this, of course, is an arbitrary number which may vary with implementation. Retrieval of each frame of SPDIF data requires the reading out from the data buffer 150 of seven (7) bytes. The audio interface circuit then appends the appropriate preamble, i.e. Z, W or M. The data receiver 120 assumes that the first frame received is the first frame of a block and appends the Z preamble to the first subframe, with subsequent subframes (3.5 bytes) being appended with the preamble of W or M as appropriate.

As discussed above, the transmission of each packet of data signal must be followed by the receipt of an acknowledgement (ACK) packet. In the event that signals are lost, e.g. data packet not received by the receiver 120 or the ACK packet not received by the transmitter 110, and the transmission and reception must be re-established, the wireless data transmitter 110 will always retransmit from the beginning of the block to re-establish synchronization. Thus, the data receiver 120 will always assume that the first frame received at the start (or the first packet received after failure in transmission/reception) is the beginning of the block, and appends the Z preamble.

The benefits of this method is that reduced transmission bandwidth is required. Further, both the data transmitter 110 and the data receiver 120 know that the start of each transmission is always from the Z preamble. The use of a priori established protocol of starting from the Z preamble in establishing synchronization means that a simple recovery routine can be implemented. Finally, the method allows byte alignment, and forces the data buffer 140 and 160 to store bytes of data. This allows compatibility with other IEC standards, such as IEC 61937.

The wireless transmission and reception of data including processing and buffering features of the present innovations may be accomplished by various systems arranged in a variety of configurations. Examples of such systems are transmitters, receivers, transceivers and combinations of the same. Moreover, these systems may be implemented with a variety of components, including those provided by way of example above. However, again, the foregoing descriptions are exemplary and explanatory only and are not restrictive of the innovations set forth herein.

For example an overall system may be comprised, inter alia, of a transmitting component and a receiving component. Because the present innovations may be applicable to and realized by the individual components, however, many of the examples above are described in the context of merely a transmitter or a receiver.

Further, as disclosed herein, embodiments and features of the invention may be implemented through computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe source code editing components such as software, systems and methods consistent with the present invention may be implemented with any combination of hardware, software and/or firmware. Moreover, the above-noted features and other aspects and principles of the present invention may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the systems and methods disclosed herein may also be implemented as a computer program product, i.e., a computer program tangibly embodied in an information carrier, e.g., in a machine readable storage medium or element or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

In one embodiment of the present invention, the transmitter 110 and receiver 120 can transmit and receive in sixty four frequencies, between 2.4 GHz and 5.9 GHz. Further, within each frequency, there are two possible channel codes. In the initial stage of establishing communication between the transmitter 110 and receiver 120, the transmitter 110 transmits the following to establish the "handshake" protocol between the transmitter 110 and the receiver 120.

Referring to FIG. 9 there is shown a state diagram of the protocol or "handshake" that initially establishes the communication between the transmitter 110 and the receiver 120 is as follows:

1. Transmitter 110 has a state status of T110, and receiver 120 has a state status of T120.
2. In the initial stage of establishing communications between the transmitter 110 and the receiver 120, T110=01 and T120=01.
3. Transmitter 110 sends a handshake packet marked with T110 to receiver 120.
4. Using CRC32, or other checksum function, receiver 120 validates the correctness of the handshake packet. If the handshake packet is correct, receiver 120 sends back an ACK packet to the transmitter 110. If the handshake packet is incorrect, receiver 120 does nothing. Since the transmitter 110 will not receive the ACK packet, it will continue by trying to send another packet. Furthermore, if the handshake packet is correct and the packet T110 extracted from the packet equals to T120, receiver 120 increases its state status of T120 by 1, so T120=02.
5. Using CRC32 or other checksum function, transmitter 110 validates the correctness of the ACK packet. If the ACK packet is correct, transmitter increases its state status by one, so that T110=02. If the ACK packet is incorrect, then the transmitter remains at its state status of T110. The transmitter 110 then re-transmits a handshake packet with its previous state status.
6. When T110=03 and T120=03 the handshake process is completed. Otherwise, the transmitter 110 and receiver 120 go back to step 3.
7. When T110=03 and T120=03, normal communication commences.

The handshake protocol as discussed above can be performed by a state machine and state transition paths. Referring to FIG. 9, the various states are as follows:

A. T110: T120=01:01—packet correct and ACK correct.
B. T110: T120=01:01—packet correct and ACK incorrect.
C. T110: T120=01:01—packet incorrect.
D. T110: T120=01:02—packet incorrect or (packet correct and ACK incorrect).
E. T110: T120=01:02—packet correct and ACK correct.
F. T110: T120=02:02—packet correct and ACK correct.
G. T110: T120=02:02—packet correct and ACK incorrect.
H. T110: T120=02:02—packet incorrect.
I. T110: T120=02:03—packet incorrect or (packet correct and ACK incorrect).
J. T110: T120=02:03—packet correct and ACK correct.

Figure 11:
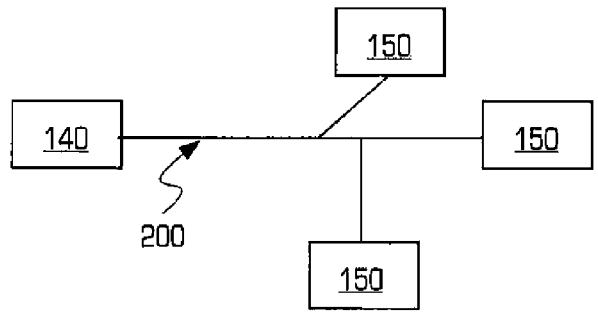
FIG. 11 is a block diagram of another embodiment of the present invention in which the data from the transmitter may be transmitted through a medium, such as a cable, to be received by a receiver.

Although the foregoing describes the wireless transmission and reception of signals, the present invention may also be used in a wired environment. Referring to FIG. 11, there is shown a block diagram of another embodiment of the present invention in which data from the data source buffer 140 may be transmitted through a medium 200, such as a coaxial cable, or electrical power wiring or any other type of medium, to be received by one or more receiving data buffers 150. In some environments such as residential structures where the structure of the housing can greatly attenuate a wirelessly transmitted signal, it may be preferred to transmit and receive the signals through an existing wired system, such as power, or cable wires. In that event, the source data buffer 140 is connected to the wired medium 200, such as coaxial cable or electrical wiring, via a connection such as that disclosed in U.S. Pat. No. 6,856,788, whose disclosure is incorporated herein by reference. In that event, the signals are then transmitted over the wired medium 200, and received by one or more receiving data buffer(s) 150 connected to the wired medium 200, without being communicated via antennas and "over the air".

Figure 12:
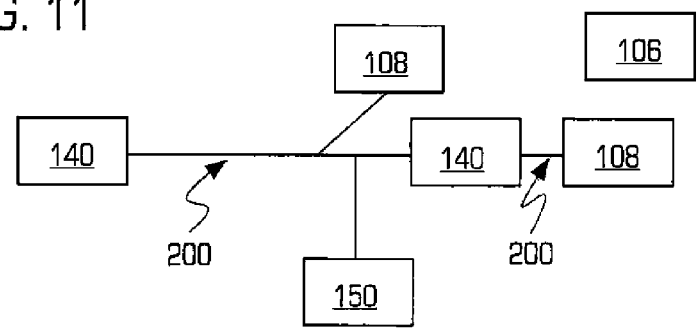
FIG. 12 is a block diagram of yet another embodiment of the present invention in which data from the transmitter may be transmitted through a medium, such as a cable, terminating at an antenna to be wirelessly further transmitted to be received wirelessly by a receiver.

Referring to FIG. 12 there is shown a block diagram of yet another embodiment of the present invention. In this embodiment, data from the data source buffer 140 is transmitted through the wired medium 200, such as a cable or power, then terminating either at a location where an transmitting antenna 108 is connected thereto or where a receiving data buffer 150 is connected thereto, or where another transmitting data source buffer 140 is connected thereto. In the event, the medium 200 terminates at the connection of an antenna 108, then the antenna 108 wirelessly transmits the signals which are received wirelessly by one or more receiving antennas 106. In this manner, the data signals from the data source buffer 140 may be transmitted partially over a wired medium 200 to by pass areas of the structure which can attenuate a wireless transmitted signal, and then wireless transmit the data signal. Similarly, at the receiving end, the signal received by the receiving antenna 106 may be supplied to the medium 200 and then supplied to the radio 156. Alternatively, if the medium 200 terminates at the connection to a receiving data buffer 150, then that portion of the signal communication is identical to that described for FIG. 11, in which the signals are transmitted and received entirely over the medium 200. Finally, in the event, the medium terminates at the connection to another data source buffer 140 (and more specifically to a radio front end 146, then the signal is re-transmitted by the second data source buffer (and more specifically the second radio front end) and supplied over another medium 200 to another, e.g. antenna 108. The use of the second data source buffer 140 may be necessary in the event, the signal attenuates over the medium 200 and the second data source buffer 140 is necessary to boost the signal strength.

Figure 13A:
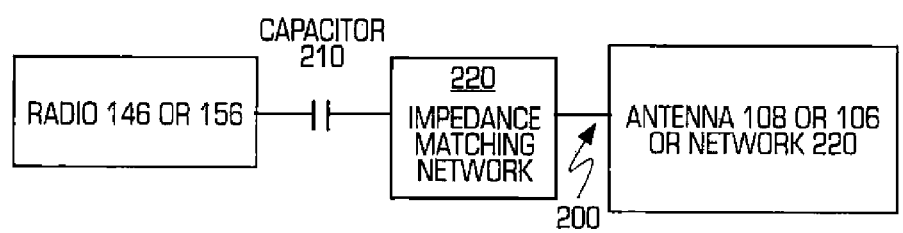
FIGS. 13(a&b) are two specific embodiments of the embodiment shown in FIG. 12, showing the connection of the radio front end to the medium such as a cable.
Figure 13B:
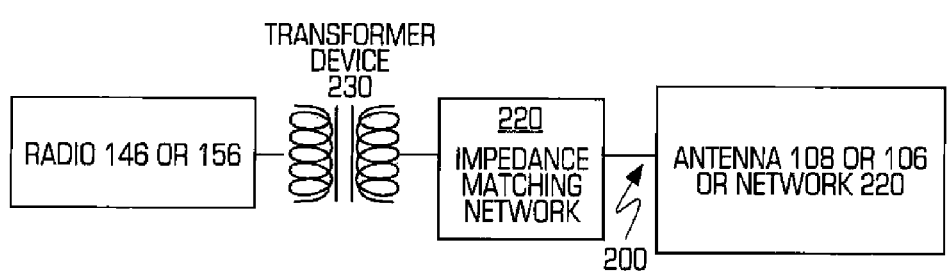

Referring to FIGS. 13a and 13b, there is shown two specific embodiments to implement the embodiment shown in FIG. 12. In FIG. 13a, the signals from the radio front end 146 (for the transmitter) or 156 (for the receiver) is connected to a capacitor 210 and is then connected to a matching impedance network 220, if needed. The matching impedance network 220 is connected to the medium 200, which is then connected to the antenna 108 (transmitting) or 106 (receiving) or to another Impedance matching network 220 (if the signal is to be connected to the receiving buffer 150 or is to be re-transmitted by another data source 140). The matching impedance network 220 is needed if the medium 200 has a specific impedance, such as 75 ohms for a RG6 cable, which must be matched by the impedance output from the capacitor 210. However, if the medium 200 does not require a certain impedance, then the matching impedance network 220 is not needed.

FIG. 13b shows another specific embodiment of the embodiment shown in FIG. 12. Similar to the embodiment shown in FIG. 13a, in FIG. 13b, the signals from the radio front end 146 (for the transmitter) or 156 (for the receiver) is connected to a transformer or hybrid device 230 which is then connected to a matching impedance network 220, if needed. The matching impedance network 220 is connected to the medium 200, which is then connected to the antenna 108 (transmitting) or 106 (receiving) or to another Impedance matching network 220 (if the signal is to be connected to the receiving buffer 150 or is to be re-transmitted by another data source 140). Again, the matching impedance network 220 is needed if the medium 200 has a specific impedance, such as 75 ohms for a RG6 cable, which must be matched by the impedance output from the transformer 230. However, if the medium 200 does not require a certain impedance, then the matching impedance network 220 is not needed.

The difference between the embodiment shown in FIG. 13a and the embodiment shown in FIG. 13b is that the embodiment shown in FIG. 13a is simple and is low cost. However, it is sufficient only for half-duplex communication. If full duplex communication is desired, then the embodiment shown in FIG. 13b is preferred. However, the embodiment shown in FIG. 13b is more costly and more complex.

It is to be understood that the foregoing description is intended to illustrate and not to limit the scope of the invention, which is defined by the scope of the appended claims. Other embodiments are within the scope of the following claims.

What is claimed is:

1. An audio transceiver for receiving a plurality of packets of encoded audio data transmitted through a first frequency via a plurality of antennas, said audio receiver comprising:
   at least one receiving component that receives the plurality of packets to generate a plurality of decoded signals, wherein the at least one receiving component is configured to:
      receive, at the first frequency, a first packet of transmitted encoded data, wherein said first packet includes information on a second frequency of transmission of a second packet subsequent to the first packet;
      receive at said second frequency, the second packet of transmitted encoded data, after the first packet; and
      transmit at the second frequency an acknowledgement packet after receipt of the second packet;
   a first buffer;
   a selecting component which selects one of said plurality of antennas by:
      dividing the total buffer size of the first buffer into a quantity of sectors equal to the quantity of antenna squared;
      assigning antenna combinations to the sectors;
      determining a sector in which the first buffer resides; and
      assigning an antenna combination from the determined sector.

2. The audio transceiver of claim 1 further comprising:
   wherein said transceiver for receiving a plurality of packets of encoded audio data transmitted through the first frequency and a first channel code;
   wherein said at least one receiving component is further configured to:
      receive at the first frequency and at the first channel code, a third packet of transmitted encoded data, wherein said third packet includes information on a second channel code of transmission of a fourth packet subsequent to the third packet;
      receive at said second channel code, the fourth packet of transmitted encoded data, after the third packet; and
      transmit at the second channel code an acknowledgement packet after receipt of the fourth packet.

3. The audio transceiver of claim 2 further comprising:
wherein said transceiver for receiving a plurality of packets of encoded audio data transmitted wirelessly through a first antenna, through the first frequency and the first channel code;
wherein said at least one receiving component is further configured to:
receive via the first antenna, at the first frequency and at the first channel code, a fifth packet of transmitted encoded data, wherein said fifth packet includes information on a second antenna to be used for receipt of a sixth packet subsequent to the fifth packet;
transmit via the first antenna at the first frequency and at the first channel code an acknowledgement packet after receipt of the fifth packet; and
change the transceiver to receive via the second antenna the sixth packet.

4. The audio transceiver of claim 1 wherein said one receiving component further comprising:
an antenna for receiving wirelessly encoded audio data signals;
a wired medium connected to said antenna for receiving said encoded audio data signals;
a radio front end circuit for decoding the encoded audio data signals; and
a coupling circuit connecting the radio front end circuit with the wired medium.

5. The audio transceiver of claim 4 wherein the coupling circuit is a capacitor.

6. The audio transceiver of claim 4 wherein the coupling circuit is a transformer.

7. The audio transceiver of claim 4 further comprising an impedance matching network between the coupling circuit and the wired medium.

8. The audio transceiver of claim 7 wherein the coupling circuit is a capacitor.

9. The audio transceiver of claim 7 wherein the coupling circuit is a transformer.

10. An audio transceiver for receiving a plurality of packets of encoded audio data transmitted through a first channel code via a plurality of antennas, said audio receiver comprising:
at least one receiving component that receives the plurality of packets to generate a plurality of decoded signals, wherein the at least one receiving component is configured to:
receive, at the first channel code, a first packet of transmitted encoded data, wherein said first packet includes information on a second channel code of transmission of packets subsequent to the first packet;
receive at said second channel code, the second packet of transmitted encoded data, after the first packet; and
transmit at the second channel code an acknowledgement packet after receipt of the second packet;
a first buffer;
a selecting component which selects one of said plurality of antennas by:
dividing the total buffer size of the first buffer into a quantity of sectors equal to the quantity of antenna squared;
assigning antenna combinations to the sectors;
determining a sector in which the first buffer resides; and
assigning an antenna combination from the determined sector.

11. The audio transceiver of claim 10 further comprising:
wherein said transceiver for receiving a plurality of packets of encoded audio data transmitted through a first frequency and the first channel code;
wherein said at least one receiving component is further configured to:
receive at the first frequency and at the first channel code, a third packet of transmitted encoded data, wherein said third packet includes information on a second frequency of transmission of a fourth packet subsequent to the third packet;
receive at said second frequency, the fourth packet of transmitted encoded data, after the third packet; and
transmit at the second frequency an acknowledgement packet after receipt of the fourth packet.

12. The audio transceiver of claim 11 further comprising:
wherein said transceiver for receiving a plurality of packets of encoded audio data transmitted wirelessly through a first antenna, through the first frequency and the first channel code;
wherein said at least one receiving component is further configured to:
receive via the first antenna, at the first frequency and at the first channel code, a fifth packet of transmitted encoded data, wherein said fifth packet includes information on a second antenna to be used for receipt of a sixth packet subsequent to the fifth packet;
transmit via the first antenna at the first frequency and at the first channel code an acknowledgement packet after receipt of the fifth packet; and
change the transceiver to receive via the second antenna the sixth packet.

13. An audio system comprising:
a transmitter that transmits a plurality of packets of encoded audio data transmitted through one or more frequencies and one or more channel codes; wherein said transmitter including:
at least one transmitting component that transmits a first packet at a first frequency and first channel codes, including information on a second frequency and/or second channel codes of transmission of packets subsequent to said first packet
a receiver including:
at least one receiving component that receives the plurality of packets via a plurality of antennas to generate a plurality of decoded signals, wherein the at least one receiving component is configured to:
receive, at the first frequency and first channel codes, the first packet of transmitted encoded data;
change the frequency and/or second channel codes to receive the second packet of transmitted encoded data, after the first packet; and
transmit at the second frequency and or second channel codes an acknowledgement packet after receipt of the second packet;
wherein said receiver further comprising:
a first buffer, and
a selecting component which selects one of said plurality of antennas by:
dividing the total buffer size of the first buffer into a quantity of sectors equal to the quantity of antenna squared;
assigning antenna combinations to the sectors;
determining a sector in which the first buffer resides; and
assigning an antenna combination from the determined sector.

14. The system of claim 13 wherein the transmitter has a transmission buffer, and wherein a level of transmission buffer is encoded in one of the packets of encoded data, said transmitter is further configure to:

transmit one of the packets of encoded data from the transmitter to determine the level of transmission buffer;

and wherein the one receiving component is configured to store the plurality of packets received in a receive buffer;

determine the level of the receive buffer;

calculate an aggregate buffer level from the transmission buffer and the receive buffer; and perform processing related to control a packet output rate from the receive buffer to maintain the aggregate buffer level at a desired level.

15. The system of claim 14 wherein the desired level is substantially a constant value.

16. The system of claim 14 wherein the desired level is a specified range.

17. The system of claim 14 wherein the packet output rate is controlled by adjusting an oscillator.

18. The system of claim 14 wherein the packet output rate is controlled at a tracking rate that varies as a function of the aggregate buffer level.

19. The system of claim 18, wherein the tracking rate is increased as a function of the aggregate buffer level being above a threshold to prevent buffer overflow.

20. The system of claim 18, wherein the tracking rate is decreased as a function of the aggregate buffer level being below a threshold to prevent buffer underflow.

21. The system of claim 20, wherein the tracking rate is decreased when the aggregate buffer level reaches a high threshold value.

22. The system of claim 21, wherein the tracking rate is increased when the aggregate buffer level reaches a low threshold value.

23. The system of claim 14, wherein the tracking rate varies to maintain the aggregate buffer level at or near substantially a constant value.

24. The system of claim 14, wherein the tracking rate varies to maintain the aggregate buffer level within a specified range.

25. The audio system of claim 13 wherein said transmitting component transmits said first packet wirelessly, and said receiving component receives the first packet of transmitted encoded data, wirelessly.

26. The audio system of claim 13 wherein said transmitting component transmits said first packet through a wired medium and said receiving component receives the first packet of transmitted encoded data through the wired medium.

27. The audio system of claim 26 wherein said transmitter including a first transmitting component, and a second transmitting component, wherein said first transmitting component transmits said first packet through a first wired medium to the second transmitting component whereby said second transmitting component re-transmits said first packet.

28. The audio system of claim 27, wherein said second transmitting component retransmits said first packet wirelessly.

29. The audio system of claim 27 wherein said second transmitting component retransmits said first packet over a second wired medium.

30. An audio transmitter for transmitting a plurality of packets of encoded audio data transmitted through a first plurality of frequencies and channel codes, said audio transmitter comprising:

a plurality of antennas;

at least one transmitting component that encodes and transmits the plurality of packets, wherein the at least one transmitting component is configured to:

transmit, at a first frequency and first channel codes, a first packet of the encoded data, wherein said first packet includes information on a second frequency and/or second channel codes of transmission of packets subsequent to said second packet;

transmit, at the second frequency and/or second channel codes, a second packet subsequent to said first packet;

continue to transmit at the second frequency and/or second channel codes in the event an acknowledgement packet is received at the second frequency and/or second channel codes; and revert to transmit, at the first frequency and first channel codes, a third packet of the encoded data, wherein said third packet includes information on the second frequency and/or second channel codes of transmission of packets subsequent to said third packet, in the event the acknowledgement packet is not received;

a first buffer; and a selecting component which selects one of said plurality of antennas by:

dividing the total buffer size of the first buffer into a quantity of sectors equal to the quantity of antenna squared;

assigning antenna combinations to the sectors;

determining a sector in which the first buffer resides; and assigning an antenna combination from the determined sector.

31. The device of claims 1, 10, 13, or 30 wherein each antenna combination assigned to the sectors is a non-repeating antenna combination.

32. The device of claims 1, 10, 13, or 30 wherein an assigned antenna is changed by:

at the selecting component, changing the assigned antenna to a new antenna;

transmitting new antenna set information to a data sink using packet header bits; and upon receipt of a valid packet, changing an assigned antenna at the data sink to the new antenna.

* * * * *